(12) United States Patent
Chenard et al.

(10) Patent No.: US 11,327,847 B2
(45) Date of Patent: May 10, 2022

(54) METHODS, DEVICES, SYSTEMS, AND COMPUTER-READABLE MEDIUMS FOR REDUCED RECOVERY POINT OBJECTIVE DURATION

(71) Applicant: Nokia Solutions and Networks OY, Espoo (FI)

(72) Inventors: Sylvain Chenard, Ottawa (CA); Walter Carpini, Ottawa (CA)

(73) Assignee: Nokia Solutions and Networks Oy, Espoo (FI)

( * ) Notice: Subject to any disclaimer, the term of this patent is extended or adjusted under 35 U.S.C. 154(b) by 28 days.

(21) Appl. No.: 16/163,989

(22) Filed: Oct. 18, 2018

(65) Prior Publication Data

US 2020/0125451 A1    Apr. 23, 2020

(51) Int. Cl.
| | | |
|---|---|---|
| *G06F 12/00* | (2006.01) |
| *G06F 11/14* | (2006.01) |
| *H04L 43/0852* | (2022.01) |
| *G06F 11/16* | (2006.01) |
| *G06F 11/20* | (2006.01) |
| *G06F 16/27* | (2019.01) |

(52) U.S. Cl.
CPC ...... *G06F 11/1464* (2013.01); *G06F 11/1443* (2013.01); *G06F 11/1451* (2013.01); *G06F 11/1662* (2013.01); *G06F 11/2094* (2013.01); *G06F 16/27* (2019.01); *H04L 43/0852* (2013.01)

(58) Field of Classification Search
CPC .. G06F 11/1464; G06F 16/27; G06F 11/1662; G06F 11/2094; G06F 11/1443; G06F 11/1451; H04L 43/0852
See application file for complete search history.

(56) References Cited

U.S. PATENT DOCUMENTS

| | | | | |
|---|---|---|---|---|
| 2010/0014510 A1* | 1/2010 | Boreli | ...................... | H04L 65/80 370/352 |
| 2012/0151164 A1* | 6/2012 | Nayak | ................. | G06F 11/2094 711/162 |
| 2014/0258772 A1* | 9/2014 | Kataria | ..................... | H04B 3/50 714/4.11 |
| 2016/0119238 A1* | 4/2016 | Jia | ........................... | H04L 47/36 709/224 |
| 2019/0187906 A1* | 6/2019 | Crawford | .............. | G06F 3/0617 |

* cited by examiner

*Primary Examiner* — Jason W Blust (74) *Attorney, Agent, or Firm* — Harness, Dickey & Pierce, P.L.C.

(57) ABSTRACT

A network device includes at least one processor, a storage device and at least one memory including computer program code. The at least one memory and the computer program code are configured to, with the at least one processor, cause the network device to: write data to the storage device; replicate the data at one or more remote network devices via at least one deterministic transmission medium; and output an acknowledgement in response to determining that the data has been written to the storage device prior to receiving confirmation of successful replication of the data at the one or more remote network devices. The methods, systems or computer readable mediums leverage the deterministic and measurable nature of the transmission media to reduce the Recover Point Objective durations.

20 Claims, 4 Drawing Sheets

METHODS, DEVICES, SYSTEMS, AND COMPUTER-READABLE MEDIUMS FOR REDUCED RECOVERY POINT OBJECTIVE DURATION

TECHNICAL FIELD

One or more example embodiments relate to computer systems and networks.

BACKGROUND

In data center environments, cloud providers may offer data solutions to provide resiliency for mission critical data.

SUMMARY

One or more example embodiments provide methods, devices, systems and non-transitory computer-readable mediums for reduced latency recovery point objective (RPO).

According to one or more example embodiments, a network device may transmit data to one or more remote network devices via a deterministic and lossless transmission medium (e.g., an optical medium). The one or more remote network devices may be geographically separate from the network device. The deterministic latency characteristics of the transmission medium enable the network device to confirm that a particular operation or transaction (e.g., storage operation) is complete without receiving acknowledgement of replication of the data at the remote network device(s).

At least one example embodiment provides a network device comprising: at least one processor; a storage device; and at least one memory including computer program code. The at least one memory and the computer program code are configured to, with the at least one processor, cause the network device to: write data to the storage device, replicate the data at one or more remote network devices via at least one deterministic transmission medium, and output an acknowledgement in response to determining that the data has been written to the storage device prior to receiving confirmation of successful replication of the data at the one or more remote network devices.

At least one other example embodiment provides a network device comprising: a storage means; a means for writing data to the storage means; a means for replicating the data at one or more remote network devices via at least one deterministic transmission medium; and a means for outputting an acknowledgement in response to determining that the data has been written to the storage means prior to receiving confirmation of successful replication of the data at the one or more remote network devices.

At least one other example embodiment provides a method of operating a network device including a storage device and a memory, the method comprising: writing data to the storage device; replicating the data at one or more remote network devices via at least one deterministic transmission medium; and outputting an acknowledgement in response to determining that the data has been written to the storage device prior to receiving confirmation of successful replication of the data at the one or more remote network devices.

At least one other example embodiment provides a non-transitory computer-readable storage medium storing computer-readable instructions that, when executed by at least one processor at a network device, cause the network device to perform a method comprising: writing data to a storage device at the network device; replicating the data at one or more remote network devices via at least one deterministic transmission medium; and outputting an acknowledgement in response to determining that the data has been written to the storage device prior to receiving confirmation of successful replication of the data at the one or more remote network devices.

According to at least some example embodiments, the network device may output the acknowledgement independent of whether the confirmation of successful replication of the data at the one or more remote network devices is received.

The network device may replicate the data at one or more remote network devices by transmitting the data to the one or more remote network devices via the at least one deterministic transmission medium.

The data may be received from a system having a recovery point, and the network device may determine the recovery point based on a first latency between receipt and storage of the data in the storage device, a second latency between receipt and transmission of the data to the one or more remote network devices, and a third latency of the at least one deterministic transmission medium. The network device may determine the recovery point as a sum of the first latency, the second latency and the third latency.

The at least one deterministic transmission medium may have a deterministic latency characteristic and/or may include at least one optical transmission medium.

The data may include a plurality of data blocks. The network device may replicate the data at one or more remote network devices by: splitting each data block into a plurality of discrete mini-blocks for transmission to the one or more remote network devices, and transmitting the plurality of discrete mini-blocks to the one or more remote network devices via the at least one deterministic transmission medium.

The plurality of discrete mini-blocks may be transmitted by: transmitting a first of the plurality of discrete mini-blocks to the one or more remote network devices via the at least one deterministic transmission medium; and retransmitting the first of the plurality of discrete mini-blocks in response to a Backwards Defect Indicator indicating an error in transmitting that the first of the plurality of discrete mini-blocks to the one or more remote network devices.

The network device may retransmit the first of the plurality of discrete mini-blocks prior to transmitting a subsequent second of the plurality of discrete mini-blocks to the one or more remote network devices.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of the network devices, data servers, or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a network device to perform the operations discussed herein.

It will be appreciated that a number of example embodiments may be used in combination.

In today's data center environment, cloud providers offer data triplication solutions to provide resiliency for mission critical data. In these solutions, data of interest is stored locally and also at one or more remote locations. Once triplicated, the data may be more secure and available in the event of subsequent failure scenarios.

For companies making use of data center services, any data loss results in business interruption and a negative impact. Reducing the potential for data loss and reducing the amount of data lost under disaster scenarios may improve the situation for businesses. Examples of business critical data include: financial transactions, recording of resource transfers, payroll transactions, etc.

In the event of a failure scenario that cannot be fixed relatively quickly, the state of the systems must be restored to a known, consistent point that is as up-to-date as possible. In planning for these failure scenarios, a Recovery Point Objective (RPO) and a Recovery Time Objective (RTO) are utilized. The RPO is an estimate of the maximum time over which data may be lost in the event of a failure scenario. The Recovery Time Objective (RTO) is an estimate of the time required to restore systems in the event that failure or disruption should occur.

One or more example embodiments utilize deterministic and lossless transmission media for replication redundancy between remote storage locations to improve RPO and/or RTO for a system. In at least one example embodiment, the deterministic and lossless transmission media may be an optical transmission media, such as an optical transmission network. By utilizing a deterministic and lossless transmission media, latency between receipt and replication of data may be directly measured (e.g., delay measurement (DM) bits in optical transport network overhead), and can be expected to remain constant or substantially constant over time. Additionally, the lossless nature of the transmission media allows for improved reliability and continuous feedback to enable more efficient diagnosis of transmission failures between remote locations.

In utilizing deterministic transmission media between a primary location (e.g., data center) and one or more remote locations (e.g., data centers), read/write of data directly from/to readable/writable media locally at the primary location may have a higher latency than reading/writing from/to optical transmission media for replication at a remote network device. This, coupled with the continuous feedback, allows for the system to conclude that the data has been successfully replicated at the one or more remote locations once having confirmed that data is successfully stored at the primary location independent of whether the remote location has provided confirmation (e.g., acknowledgement) that the data has been successfully replicated.

According to one or more example embodiments, replication is successful if the data has been duplicated and stored on local and remote network devices without errors.

Moreover, read/write of data directly from/to readable/writable media locally at the primary location may be performed concurrently and/or simultaneously with replication of the data at one or more remote locations.

Figure 1:
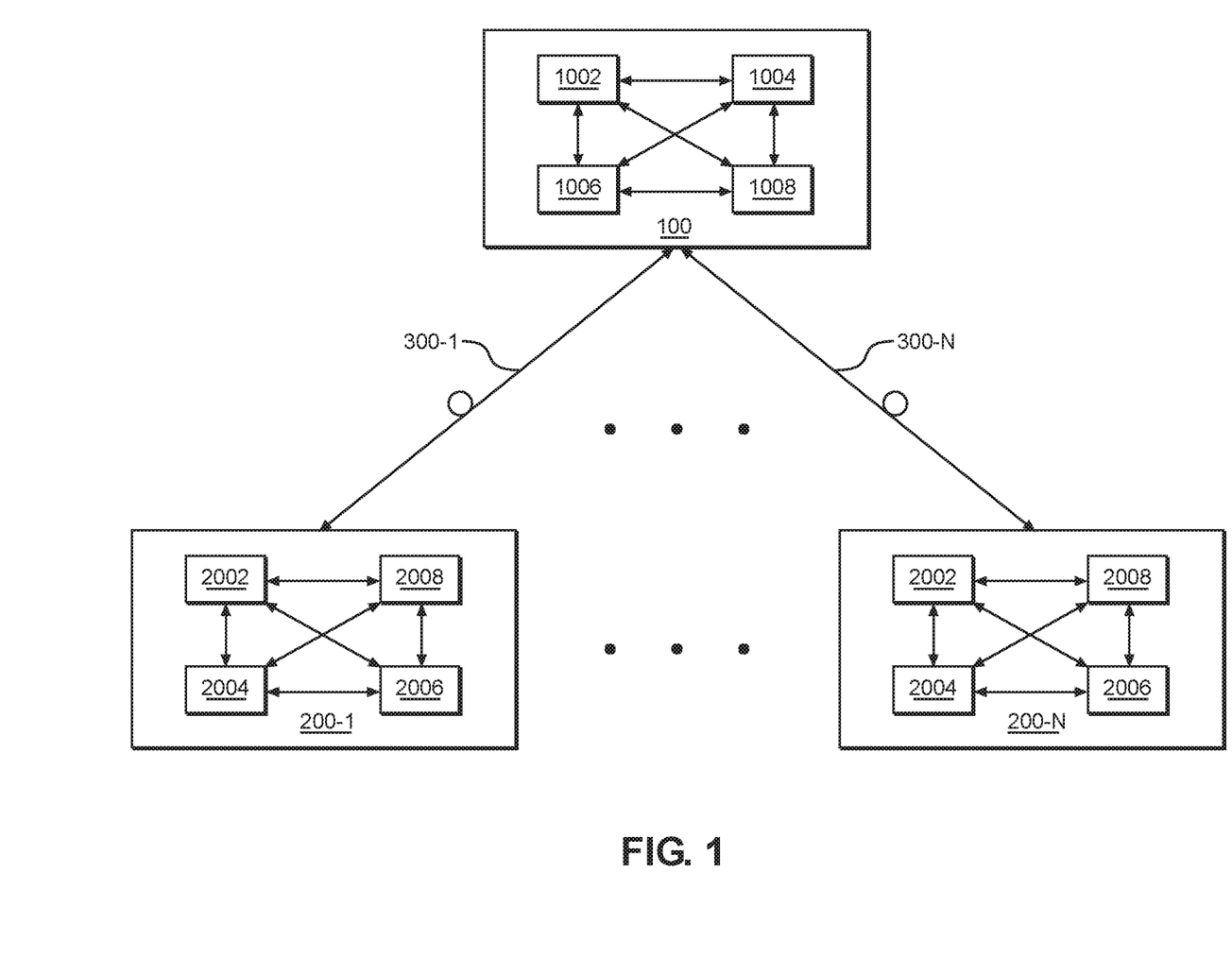
FIG. 1 depicts a system of network devices according to one or more example embodiments.

FIG. 1 depicts a system of network devices according to one or more example embodiments.

Referring to FIG. 1, the system includes a local network device 100 at a primary location and a plurality of remote network devices 200-1, . . . , 200-N at a plurality of remote locations. The primary location may be geographically separate from the plurality of remote locations. The local network device 100 may also be referred to as a primary network device or a network device.

The plurality of remote network devices 200-1 through 200-N may include two or more remote network devices. The remote network devices may also be referred to herein as secondary network devices. Although discussed with regard to a plurality of remote network devices 200-1 through 200-N, example embodiments may be applicable to systems including one or more remote network devices.

In one example, the network devices 100 and 200-1 through 200-N may be data or cloud servers in data centers or server farms including a plurality of data servers.

Although discussed with regard to a local network device and a plurality of remote network devices, example embodiments may also be applicable to data centers including a plurality of local servers at a first location and a plurality of remote data centers, each including a plurality of remote servers.

The local network device 100 includes one or more processors 1006 (e.g., a central processing unit (CPU) or other suitable processor(s)), a volatile memory (or buffer) 1002, a non-volatile memory 1004 and a transceiver (e.g., an optical transceiver, such as a fiber optic transceiver) 1008. Each of the components/elements of the local network device 100 may be operatively coupled to each of the other components/elements of the local network device.

The non-volatile memory 1004 may include one or more devices for storing data, including read only memory (ROM), random access memory (RAM), magnetic RAM, core memory, magnetic disk storage mediums, optical storage mediums, flash memory devices and/or other tangible machine-readable mediums for storing information.

Although not shown, the local network device 100 may further include a cooperating module/process, one or more input/output devices (e.g., a user input device (such as a keyboard, a keypad, a mouse, and the like), a user output device (such as a display, a speaker, and the like), an input port, an output port, or the like). The cooperating process may be loaded into a memory (e.g., memory 1004) and executed by the processor 1006 to implement functions as discussed herein.

Still referring to FIG. 1, the local network device 100 is communicatively coupled to each of the plurality of remote network devices 200-1 through 200-N via a respective deterministic and lossless transmission medium 300-1 through 300-N. As mentioned similarly above, for example purposes, example embodiments will be discussed herein with regard to a glass medium, and more specifically an optical transmission network. However, example embodiments should not be limited to this example. Rather, example embodiments may be applicable to any transmission medium having a deterministic latency characteristic; that is, a system following a deterministic model that produces the same output from a given starting condition or initial state.

Each of the plurality of remote network devices 200-1 through 200-N includes one or more processors 2006 (e.g., a central processing unit (CPU) or other suitable processor(s)), a volatile memory (or buffer) 2002, a non-volatile memory 2004 and a transceiver (e.g., an optical transceiver, such as a fiber optic transceiver) 2008. Each of the components/elements of a respective remote network device 200-1 through 200-N may be operatively coupled to each of the other components/elements of the respective remote network device 200-1 through 200-N.

The non-volatile memory 2004 may include one or more devices for storing data, including read only memory (ROM), random access memory (RAM), magnetic RAM, core memory, magnetic disk storage mediums, optical storage mediums, flash memory devices and/or other tangible machine-readable mediums for storing information.

Although not shown, each remote network device 200-1 through 200-N may further include a cooperating module/process, one or more input/output devices (e.g., a user input device (such as a keyboard, a keypad, a mouse, and the like), a user output device (such as a display, a speaker, and the like), an input port, an output port, or the like). The cooperating process may be loaded into a memory (e.g., memory 2004) and executed by the processor 2006 to implement functions as discussed herein.

Example functionality of the network devices 100 and 200-1 through 200-N will be discussed in more detail below with regard to FIGS. 2 and 3.

Figure 2:
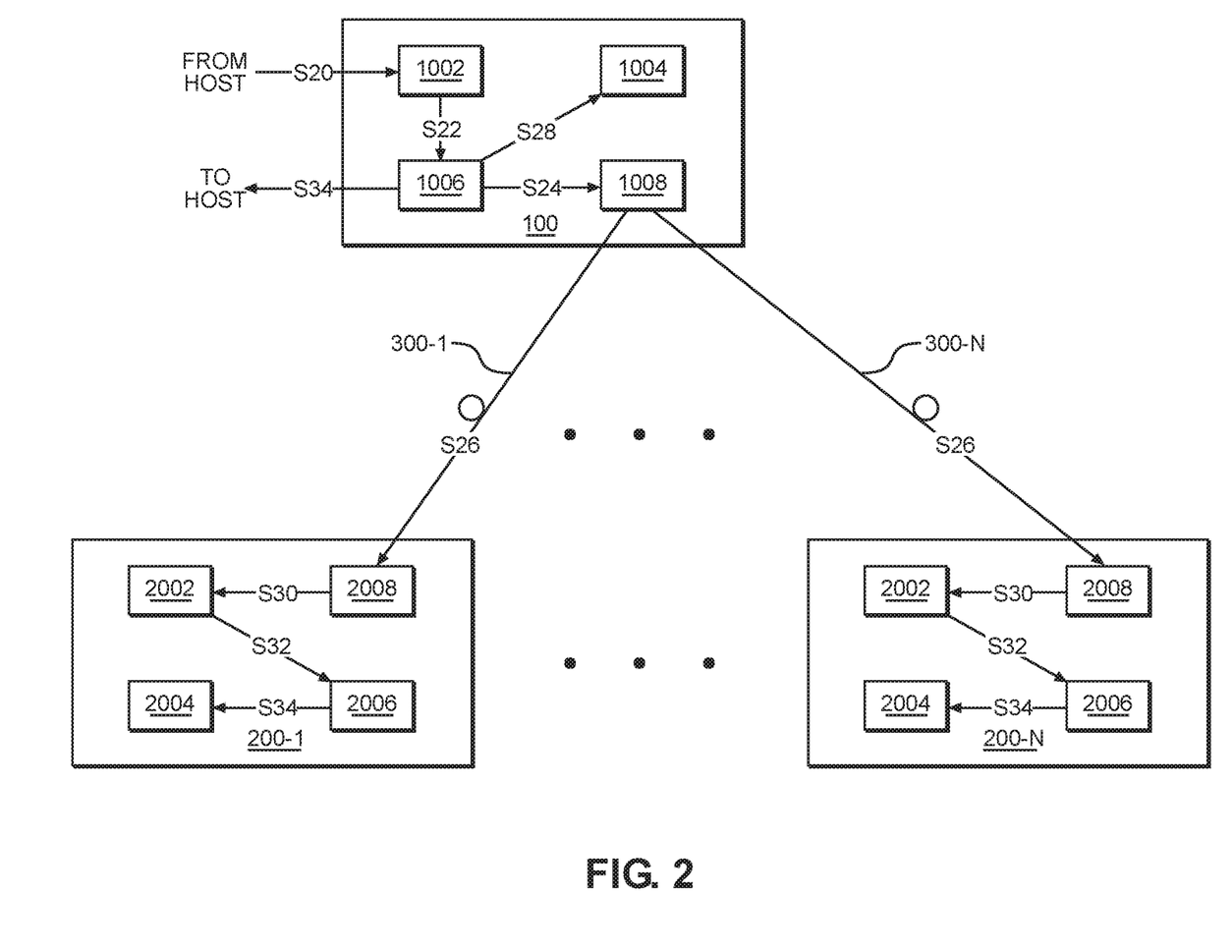
FIG. 2 depicts a system of network devices including an embedded flow diagram illustrating a method according to one or more example embodiments.

FIG. 2 illustrates the system shown in FIG. 1 along with a flow diagram embedded therein. The flow diagram illustrates a method according to one or more example embodiments.

One or more example embodiments will be discussed with regard to a write transaction at the local network device 100 and remote network devices 200-1 through 200-N in response to data received at the local network device 100 from a host (not shown). It should be understood, however, that example embodiments may be applicable to other operations and transactions. The host may be, be part of, or include, a system having a recovery point.

Referring to FIG. 2, at operation S20, the local network device 100 receives data to be stored in the non-volatile memory 1004 from the host and buffers the received data in the volatile memory 1002.

At operation S22, the processor 1006 reads the buffered data from the volatile memory 1002, and at operation S24 the processor 1006 processes and outputs the buffered data to the transceiver 1008 for transmission to the plurality of remote network devices 200-1 through 200-N via the respective deterministic transmission medium 300-1 through 300-N. As discussed in more detail later, according to one or more example embodiments, the processor 1006 may process the buffered data by splitting the data (e.g., blocks of data or data blocks) into a sequence of a plurality of discrete mini-blocks, and transmitting the plurality of discrete mini-blocks to the plurality of remote network devices 200-1 through 200-N via the respective deterministic transmission medium 300-1 through 300-N.

At operation S26, the transceiver 1008 transmits the received data to the plurality of remote network devices 200-1 through 200-N via the deterministic transmission medium 300-1 through 300-N to replicate the data at each of the plurality of remote network devices 200-1 through 200-N.

Concurrently with the output of the buffered data to the transceiver 1008 (at S24) and/or transmission of the buffered data to the plurality of remote network devices 200-1 through 200-N (at S26), at operation S28 the processor 1006 initiates writing of the buffered data from the volatile memory 1002 to the non-volatile memory 1004. Once the writing of the buffered data to the non-volatile memory 1004 is complete, at operation S34 the local network device 100 acknowledges completion of the operation (e.g., both storage and replication operations) based on confirmation of data successfully being transferred onto the deterministic transmission media (e.g., as discussed below with regard to FIG. 3), but independent and without regard to the result of the replication of the data at the plurality of remote network devices 200-1 through 200-N. Thus, unlike conventional data replication in which a local network device acknowledges successful completion of the data storage operation (the transaction) only after receiving confirmation from the remote processor 2006 of successful replication of data at two or more remote locations, the local network device 100 may acknowledge that the storage and replication operations (the transaction) are successfully completed prior to receiving confirmation of successful replication of the data from the plurality of remote network devices 200-1 through 200-N. Additionally, systems according to one or more example embodiments operate asynchronously.

Still referring to FIG. 2, at each of the remote network devices 200-1 through 200-N, the data from the local network device 100 is received at the transceiver 2008 via the respective deterministic transmission medium 300-1 through 300-N. Upon receiving the data, the remote network devices 200-1 through 200-N output a backward defect indication for each received mini-block in the reverse direction on the respective deterministic transmission medium 300-1 through 300-N to indicate whether the respective mini-block has been successfully received or an error has occurred. The backward defect indication will be discussed in more detail later.

The transceiver 2008 outputs the received data to the volatile memory 2002 for buffering at operation S30.

At operation S32, the processor 2006 reads the buffered data from the volatile memory 2002, and at operation S34 the processor 2006 stores the buffered data in the non-volatile memory 2004. The processor 2006 may also reassemble the plurality of discrete mini-blocks into data blocks as necessary.

Upon successful storage (and replication) of the buffered data in the non-volatile memory 2004, the respective remote network device may send a confirmation message (acknowledgement) to the local network device 100 indicating that the data has been successfully replicated at the remote network device.

Still referring to FIGS. 1 and 2, as mentioned above at operation S24 the processor 1006 processes the buffered data for transmission to, and replication at, the plurality of remote network devices 200-1 through 200-N. As discussed above, according to one or more example embodiments, the processor 1006 may process the buffered data by splitting the data (e.g., blocks of data or data blocks) into a sequence of a plurality of discrete mini-blocks, and transmitting the plurality of discrete mini-blocks to the plurality of remote network devices 200-1 through 200-N via the respective deterministic transmission medium 300-1 through 300-N. The size of the plurality of discrete mini-blocks may reflect transmission delay and transmission bitrate for the respective deterministic transmission media 300-1 through 300-N. By splitting the data into mini-blocks, transmission errors may be corrected in essentially real-time to ensure that replication of the data is successfully completed at the plurality of remote network devices 200-1 through 200-N with reduced latency even in situations where transmission errors occur. In an example in which the deterministic transmission medium is an optical transport network, a Backwards Defect Indicator (BDI) may be used to indicate transmission errors requiring re-transmission of a given mini-block by the local network device 100.

For example purposes, FIG. 2 illustrates an example adjust module install on a host such as a PCe card, where the host writes to the memory (e.g., a card memory) 1002 and signals the processor 1006 to read the data from the memory 1002. It should be understood, however, that example embodiments are not limited to this example. Rather, example embodiments may be applicable to a write-through cache scenario in which data from the host is received at processor 1006 (S20), and the processor 1006 writes the received data through the memory 1002 to the non-volatile memory 1004 while concurrently or simultaneously outputting/writing the data to the transceiver 1008. Example embodiments may also be applicable to any other mechanism or method to write to non-volatile memory or the like.

Figure 3:
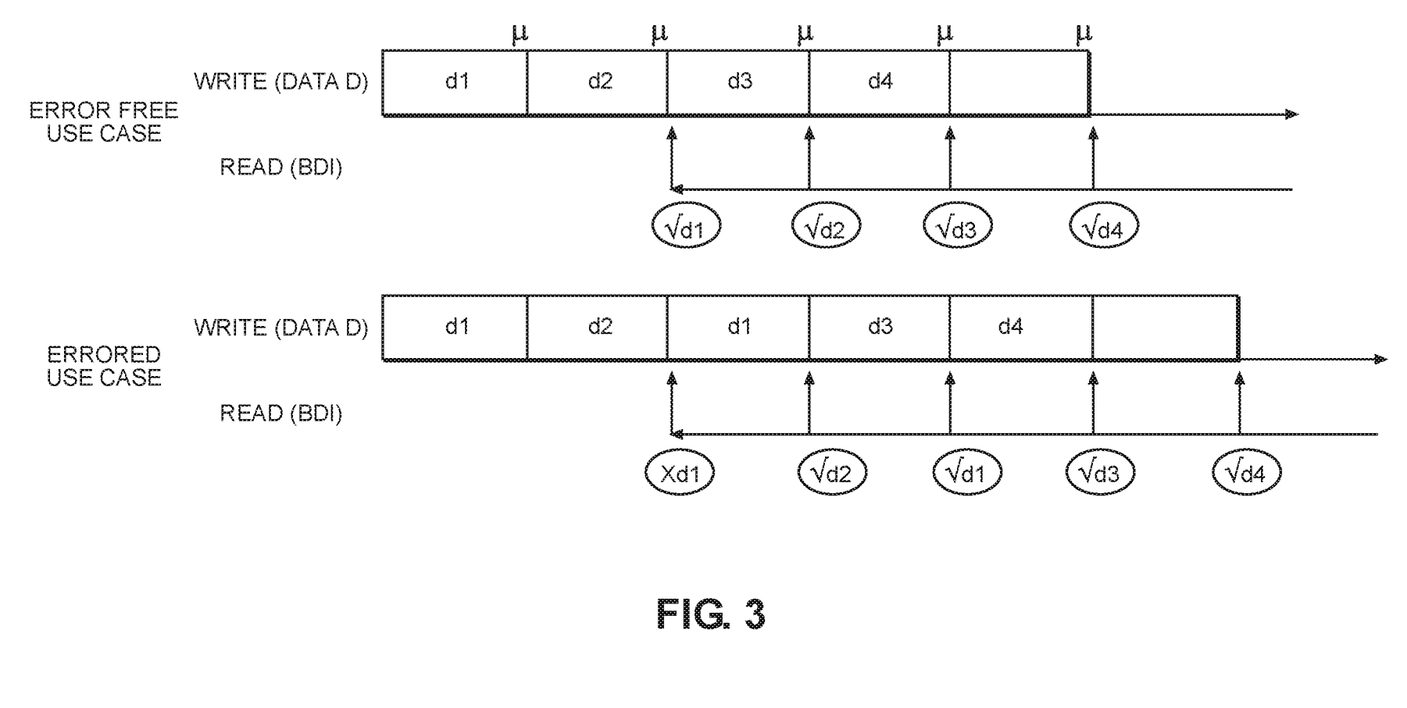
FIG. 3 illustrates an example in which a data block for replication is split into a plurality of mini-blocks, according to one or more example embodiments.

FIG. 3 illustrates an example in which a data block for replication is split into a plurality of mini-blocks. The example shown in FIG. 3 illustrates, among other things, the role of a Backwards Defect Indicator (BDI) in one or more example embodiments.

Referring to FIG. 3, the data block is split into a sequence of a plurality of mini-blocks d1, d2, d3 and d4, each of which has a bit block size (or length) that reflects the transmission delay p and transmission bitrate for the deterministic transmission mediums 300-1 through 300-N between the local network device 100 and the plurality of remote network devices 200-1 through 200-N. In this regard, the local network device 100 determines the bit block sizes for the plurality of mini-blocks such that the end of transmission time for a mini-block coincides with the (one-way) transmission delay or latency between the local network device 100 and the plurality of remote servers 200-1 through 200-N.

The example shown in FIG. 3 illustrates an error free use case and an errored use case.

In the error free use case, the local network device 100 receives a BDI indicating successful transmission after transmitting each individual mini-block to a remote network device. As a result, the local network device 100 receives immediate feedback on a block-by-block basis, rather than waiting until all data is transmitted for an indication of whether transmission errors have occurred. In one example, the deterministic and lossless nature of the transmission medium allows for receipt of the BDI for a mini-block to coincide with the round trip transmission delay for the transmission medium. Thus, the local network device 100 may receive a BDI for a given mini-block from a remote data server 2μ after transmission of a given mini-block. Additionally, the writing of a mini-block at a remote data server (S34 in FIG. 2) may be assumed to begin p (the transmission delay) after the local network device 100 transmits the mini-block. According to one or more example embodiments, p may be a unit of time on the order of microseconds.

As shown by way of the errored use case in FIG. 3, if a transmission error occurs (e.g., a BDI is received) with regard to mini-block d1, for example, then the local network device 100 may immediately re-transmit at least the errored mini-block block d1 upon receipt of the BDI 2μ (where μ is the one-way transmission delay and 2μ is the roundtrip delay) after transmitting the mini-block d1, but before transmitting the next mini-block d3 in the sequence of mini-blocks. In the example embodiment shown in FIG. 3, the local network device re-transmits only mini-block d1 in response to receiving a BDI indicating an error in mini-block d1, and then proceeds with transmission of mini-block d3. Thus, at the receive end, the remote network device may re-order the received mini-blocks to reconstruct the data.

Additionally, in the example embodiment shown in FIG. 3, the buffer size for the received data at the remote network device may be at least 2μ (where μ is the one-way transmission delay). This may enable the local network device 100 to receive positive acknowledgment that each mini-block has been received error free by the remote network device.

Figure 4:
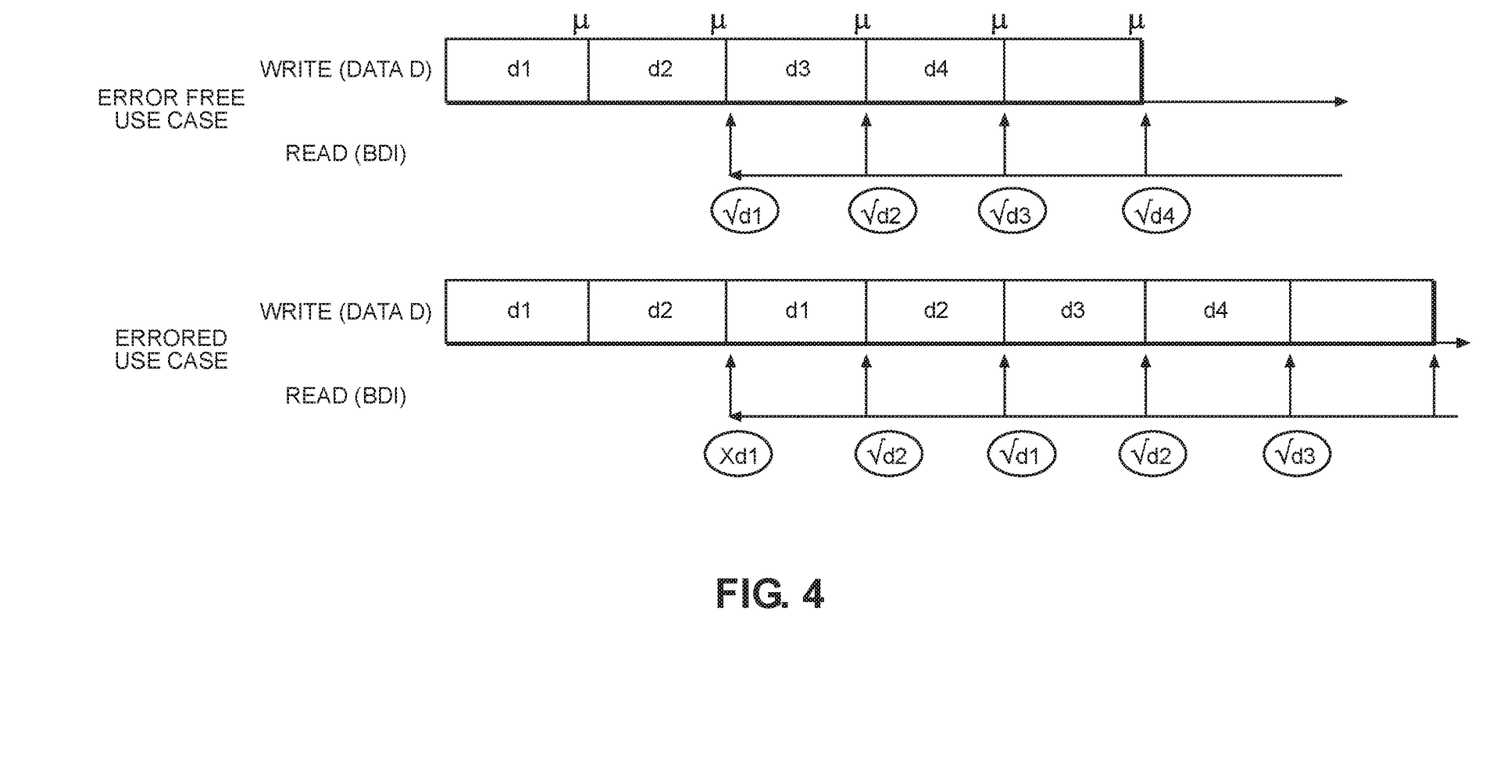
FIG. 4 illustrates another example in which a data block for replication is split into a plurality of mini-blocks, according to one or more example embodiments.

FIG. 4 illustrates another example in which a data block for replication is split into a plurality of mini-blocks.

Referring to FIG. 4, the data block is split into a sequence of a plurality of mini-blocks d1, d2, d3 and d4, each of which has a bit block size (or length) that reflects the (one-way) transmission delay p and transmission bitrate for the deterministic transmission mediums 300-1 through 300-N between the local network device 100 and the plurality of remote network devices 200-1 through 200-N. As with FIG. 3, the example shown in FIG. 4 illustrates an error free use case and an errored use case.

The error free use case in FIG. 4 is the same as the error free use case shown in FIG. 3.

As shown by way of the errored use case in FIG. 4, if a transmission error occurs with regard to mini-block d1 (e.g., a BDI is received 2μ after transmission of the mini-block d1, where p is the one-way transmission delay), then the local network device 100 may immediately re-transmit at least the errored mini-block block d1 and the next mini-block d2 before transmitting the next mini-block d3 in the sequence of mini-blocks.

In the example embodiment shown in FIG. 4, the local network device 100 resends both the errored mini-block d1 and the next mini-block d2. As a result, the remote network device need not re-order the received mini-blocks to reconstruct the data.

Additionally, as with the example embodiment shown in FIG. 3, in FIG. 4 the buffer size for the received data at the remote network device may be at least 2μ (2× the transmission delay, that is, the round trip delay). This may enable the local network device 100 to receive positive acknowledgment that each mini-block has been received error free by the remote network device.

One or more example embodiments also provide methods for determining and improving a Recovery Point Objective (RPO).

According to one or more example embodiments, the length of time (duration) between receipt of the data (initiation of the data transaction) at operation S22 and the acknowledgement output to the host at operation S34 may be the sum of the lengths of time required to complete operations S22, S24, S28 and the round trip transmission latency 2μ, where μ is the one way transmission delay as shown below in Equation (1).

$$TR(S22,S34)=\text{Duration}(S22)+\text{Duration}(S24)+\text{Duration}(S28)+2\mu \quad (1)$$

In Equation (2), TR(S22, S34) is the time required to complete the data transaction, Duration(S22) is the length of time to complete operation S22, Duration(S24) is the length of time to complete operation S24, and Duration(S28) is the length of time to complete operation S28.

Since the Duration(S28) is independent of the other actions, the RPO may be based on Duration(S22), Duration(S24) and μ without taking into account Duration(S28). In one example, the RPO may be given by Equation (2) shown below.

$$RPO=\text{Duration}(S22)+\text{Duration}(S24)+2\mu \quad (2)$$

At least one example embodiment reduces RPO to provide improved RPO results in suppressing negative impact to computer systems or data centers in, for example, disaster situations. In addition, the reduction of RPO may simplify or improve geo-redundancy applications thereby reducing computation complexity and saving processing resources at data centers. In at least one example, this technology may enable real-time geo-redundancy on micro-transactions, such as inter-bank financial transactions, data center disk replication, or the like.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network elements, network devices, data servers, network resource controllers, clients, routers, gateways, nodes, computers, cloud-based servers, web servers, application servers, proxies or proxy servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Although example embodiments are discussed herein with regard to data servers, network devices may also include be network elements such as network resource controllers, clients, routers, gateways, nodes, computers, cloud-based servers, web servers, application servers, proxies or proxy servers, or the like.

According to example embodiments, network elements, network devices, data servers, network resource controllers, clients, routers, gateways, nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A network device comprising:
   at least one processor;
   a storage device; and
   at least one memory including computer program code, the at least one memory and the computer program code configured to, with the at least one processor, cause the network device to
      write data to the storage device, the data including a plurality of data blocks,
      replicate the data at one or more remote network devices via a deterministic transmission medium, the replicating the data including
         splitting each data block into a plurality of discrete mini-blocks based on at least one of a transmission delay or a transmission bitrate of the deterministic transmission medium such that a time to output a discrete mini-block of the plurality of discrete mini-blocks coincides with the transmission delay of the deterministic transmission medium, and
         transmitting the plurality of discrete mini-blocks to the deterministic transmission medium, and
      after writing the data to the storage device and prior to receiving confirmation of successful replication of the data at the one or more remote network devices, output an acknowledgement based on the transmitting the plurality of discrete mini-blocks to the deterministic transmission medium.

2. The network device of claim 1, wherein the at least one memory and the computer program code are further configured to, with the at least one processor, cause the network device to
   output the acknowledgement independent of whether the confirmation of successful replication of the data at the one or more remote network devices is received.

3. The network device of claim 1, wherein
   the data is received from a system having a recovery point; and
   the at least one memory and the computer program code are further configured to, with the at least one processor, cause the network device to determine the recovery point based on a first latency between receipt and storage of the data in the storage device, a second latency between receipt and transmission of the data to the one or more remote network devices, and a third latency of the deterministic transmission medium.

4. The network device of claim 3, wherein the at least one memory and the computer program code are further configured to, with the at least one processor, cause the network device to determine the recovery point as a sum of the first latency, the second latency and the third latency.

5. The network device of claim 1, wherein the deterministic transmission medium is an optical transmission medium.

6. The network device of claim 1, wherein the deterministic transmission medium has a deterministic latency characteristic.

7. The network device of claim 1, wherein the transmitting the plurality of discrete mini-blocks comprises:
   transmitting a first of the plurality of discrete mini-blocks to the one or more remote network devices via the deterministic transmission medium; and
   retransmitting the first of the plurality of discrete mini-blocks in response to a Backwards Defect Indicator indicating an error in transmitting that the first of the plurality of discrete mini-blocks to the one or more remote network devices.

8. The network device of claim 7, wherein the at least one memory and the computer program code are further configured to, with the at least one processor, cause the network device to retransmit the first of the plurality of discrete mini-blocks prior to transmitting a subsequent second of the plurality of discrete mini-blocks to the one or more remote network devices.

9. The network device of claim 1, wherein the at least one memory and the computer program code are configured to, with the at least one processor, cause the network device to
   split each data block into the plurality of discrete mini-blocks based on the transmission delay of the deterministic transmission medium.

10. The network device of claim 1, wherein the time to output the discrete mini-block is a time for the processor to output the discrete mini-block to the deterministic transmission medium.

11. A method of operating a network device including a storage device and a memory, the method comprising:
   writing data to the storage device, the data including a plurality of data blocks; replicating the data at one or more remote network devices via a deterministic transmission medium, the replicating the data including
      splitting each data block into a plurality of discrete mini-blocks based on at least one of a transmission delay or a transmission bitrate of the deterministic transmission medium such that a time to output a discrete mini-block of the plurality of discrete mini-blocks coincides with the transmission delay of the deterministic transmission medium, and
      transmitting the plurality of discrete mini-blocks to the deterministic transmission medium; and
   outputting an acknowledgement in response to determining that the data has been written to the storage device after writing the data to the storage device and prior to receiving confirmation of successful replication of the data at the one or more remote network devices,
      outputting an acknowledgement based on the transmitting the plurality of discrete mini-blocks to the deterministic transmission medium.

12. The method of claim 11, wherein the outputting comprises:
   outputting the acknowledgement independent of whether the confirmation of successful replication of the data at the one or more remote network devices is received.

13. The method of claim 11, further comprising:
   receiving the data from a system having a recovery point; and
   determining the recovery point based on a first latency between receipt and storage of the data in the storage device, a second latency between receipt and transmission of the data to the one or more remote network devices, and a third latency of the deterministic transmission medium.

14. The method of claim 11, wherein the deterministic transmission medium is an optical transmission medium.

15. The method of claim 11, wherein the deterministic transmission medium has a deterministic latency characteristic.

16. The method of claim 11, wherein the transmitting the plurality of discrete mini-blocks comprises:
   transmitting a first of the plurality of discrete mini-blocks to the one or more remote network devices via the deterministic transmission medium; and
   retransmitting the first of the plurality of discrete mini-blocks in response to a Backwards Defect Indicator indicating an error in transmitting that the first of the plurality of discrete mini-blocks to the one or more remote network devices.

17. The method of claim 16, wherein the retransmitting comprises:
   retransmitting the first of the plurality of discrete mini-blocks prior to transmitting a subsequent second of the plurality of discrete mini-blocks to the one or more remote network devices.

18. A non-transitory computer-readable storage medium storing computer-readable instructions that, when executed by at least one processor at a network device, cause the network device to perform a method comprising:
   writing data to a storage device at the network device, the data including a plurality of data blocks;
   replicating the data at one or more remote network devices via a deterministic transmission medium, the replicating the data including
      splitting each data block into a plurality of discrete mini-blocks based on at least one of a transmission delay or a transmission bitrate of the deterministic transmission medium such that a time to output a discrete mini-block of the plurality of discrete mini-blocks coincides with the transmission delay of the deterministic transmission medium, and
      transmitting the plurality of discrete mini-blocks to the deterministic transmission medium; and
   after writing the data to the storage device and prior to receiving confirmation of successful replication of the data at the one or more remote network devices,
      outputting an acknowledgement based on the transmitting the plurality of discrete mini-blocks to the deterministic transmission medium.

19. A network device comprising:
   at least one processor;
   a storage device; and
   at least one memory including computer program code, the at least one memory and the computer program code configured to, with the at least one processor, cause the network device to receive data from a system having a recovery point, write the data to the storage device, replicate the data at one or more remote network devices via a deterministic transmission medium, the replicating of the data including transmitting the data to the deterministic transmission medium, after the writing of the data to the storage device and prior to receiving confirmation of successful replication of the data at the one or more remote network devices,     output an acknowledgement based on the transmitting of the data to the deterministic transmission medium, and determine the recovery point based on a first latency between receipt and storage of the data in the storage device, a second latency between receipt and transmission of the data to the one or more remote network devices, and a third latency of the deterministic transmission medium.

20. A method of operating a network device including a storage device and a memory, the method comprising:

receiving data from a system having a recovery point;

writing the data to the storage device;

replicating the data at one or more remote network devices via a deterministic transmission medium, the replicating of the data including transmitting the data to the deterministic transmission medium;

outputting an acknowledgement in response to determining that the data has been written to the storage device after the writing of the data to the storage device and prior to receiving confirmation of successful replication of the data at the one or more remote network devices,     outputting an acknowledgement based on the transmitting of the data to the deterministic transmission medium; and     determining the recovery point based on a first latency between receipt and storage of the data in the storage device, a second latency between receipt and transmission of the data to the one or more remote network devices, and a third latency of the deterministic transmission medium.

\* \* \* \* \*